United States Patent
Qiao et al.

(10) Patent No.: US 10,178,190 B2
(45) Date of Patent: Jan. 8, 2019

(54) METHOD AND SYSTEM FOR EXTRACTING USER BEHAVIOR FEATURES TO PERSONALIZE RECOMMENDATIONS

(71) Applicant: Alibaba Group Holding Limited, Grand Cayman (KY)

(72) Inventors: Ping Qiao, Hangzhou (CN); Minggang Wu, Hangzhou (CN)

(73) Assignee: Alibaba Group Holding Limited

(*) Notice: Subject to any disclaimer, the term of this patent is extended or adjusted under 35 U.S.C. 154(b) by 365 days.

(21) Appl. No.: 14/495,749

(22) Filed: Sep. 24, 2014

(65) Prior Publication Data

US 2015/0088911 A1   Mar. 26, 2015

(30) Foreign Application Priority Data

Sep. 25, 2013 (CN) .......................... 2013 1 0447654

(51) Int. Cl.
G06F 17/30 (2006.01)
H04L 29/08 (2006.01)
G06Q 30/00 (2012.01)

(52) U.S. Cl.
CPC ........ H04L 67/22 (2013.01); G06F 17/30867 (2013.01); G06Q 30/00 (2013.01)

(58) Field of Classification Search
CPC .... H04L 67/22; G06F 17/30867; G06Q 30/00
See application file for complete search history.

(56) References Cited

U.S. PATENT DOCUMENTS 7,962,929 B1 * 6/2011 Oddo ..................... H04H 60/33
725/13
8,615,442 B1 * 12/2013 Kapur ............... G06Q 30/0269
705/26.1

(Continued)

FOREIGN PATENT DOCUMENTS

CN   101968802 A   2/2011
CN   102567511 A   7/2012

(Continued)

OTHER PUBLICATIONS

Cyrus Chahabi et al, Knowledge discovery from users Web-page navigation, Aug. 6, 2002, IEEE, p. 3.*

(Continued)

*Primary Examiner* — Augustine K. Obisesan
*Assistant Examiner* — Lahcen Ennaji
(74) *Attorney, Agent, or Firm* — Lee & Hayes, PC

(57) ABSTRACT

A method for extracting user features based on user behaviors. The method uses webpage clickstream data of a current user to compute a path correlation between the current user and other users, selects a number of other users whose path correlation with the current user ranks among the highest, and then configures weights in connection to preset tags of websites visited by the selected other users, and computes a user correlation between the current user and the selected other users based on the preset tags and the weights. The method constructs weighted-directed graphs of webpage click paths based on click stream data, and converts computing user correlation to computing a similarity of weighted-directed graphs. The method further combines computing correlation of webpage tags to discover the user's clicking habits and personal preferences, and improve the accuracy and efficiency of user clustering.

20 Claims, 5 Drawing Sheets

(56) References Cited

U.S. PATENT DOCUMENTS

| | | |
|---|---|---|
| 2007/0203872 A1 | 8/2007 | Flinn et al. |
| 2009/0006363 A1 | 1/2009 | Canny et al. |
| 2009/0164395 A1* | 6/2009 | Heck ................. G06F 17/30873 |
| | | 706/16 |
| 2009/0171763 A1 | 7/2009 | Dong et al. |
| 2010/0030766 A1 | 2/2010 | Li et al. |
| 2010/0131835 A1* | 5/2010 | Kumar ............... G06Q 30/0224 |
| | | 715/205 |
| 2011/0029505 A1 | 2/2011 | Scholz et al. |
| 2012/0059707 A1 | 3/2012 | Goenka et al. |
| 2012/0254098 A1 | 10/2012 | Flinn et al. |
| 2012/0290575 A1* | 11/2012 | Hu .................... G06F 17/30867 |
| | | 707/737 |
| 2013/0044053 A1 | 2/2013 | Galor et al. |
| 2013/0124298 A1 | 5/2013 | Li et al. |
| 2013/0198030 A1 | 8/2013 | Linden et al. |

FOREIGN PATENT DOCUMENTS

| | | |
|---|---|---|
| CN | 103052964 A | 4/2013 |
| JP | 2004257014 | 9/2004 |
| JP | 2006254009 | 9/2006 |
| JP | 2006331014 | 12/2006 |
| JP | 2009193465 | 8/2009 |
| WO | WO2010/059978 A2 | 5/2010 |

OTHER PUBLICATIONS

Zhang et al. Efficient Hybrid Web Recommendation Based on Markov Clickstream Models and Implicit Search, 2007, ACM, 622-627.*

PCT Search Report and Written Opinion dated Apr. 22, 2015 for PCT Application No. PCT/US14/57279, 8 Pages.

The Extended European Search Report dated Mar. 23, 2017 for European patent application No. 14790816.4, 6 pages.

Translated Chinese Office Action for Chinese Patent Application No. CN201310447654.4, dated Jun. 2, 2017, a counterpart foreign application of U.S. Appl. No. 14/495,749, 21 pages.

CN Search Report for Chinese Patent Application No. CN201310447654.4, dated May 23, 2017, a counterpart foreign application of U.S. Appl. No. 14/495,749, 2 pages.

The Translated Japanese Office Action dated Aug. 14, 2018 for Japanese Application No. 2016-545218, a counterpart foreign application of U.S. Appl. No. 14/495,749, 8 pages.

Machine translated Office Action for CN patent application No. 201310447654.4, dated Feb. 26, 2018, 13 pages.

CN Supplemental Search report for CN patent application No. 201310447654.4, dated Feb. 11, 2018, 1 page.

* cited by examiner

METHOD AND SYSTEM FOR EXTRACTING USER BEHAVIOR FEATURES TO PERSONALIZE RECOMMENDATIONS

This application claims foreign priority to Chinese Patent Application No. 201310447654.4 filed on Sep. 25, 2013, entitled "METHOD AND SYSTEM FOR EXTRACTING USER BEHAVIOR FEATURES TO PERSONALIZE RECOMMENDATIONS", Chinese Patent Application is hereby incorporated by reference in its entirety.

TECHNICAL FIELD

The present application relates to data processing, and more particularly to extracting user behavior features and making personalized recommendations based on user behaviors.

BACKGROUND

The rapid development of the Internet has brought people into an information society and network economy era, and has had a profound influence on both enterprise developments and personal lives. At the same time, however, an excessive amount of information makes it difficult for people to efficiently get what they need, lowering the efficiency of utilizing information.

E-commerce, for example, is a new business model in an open network environment, and offers browser/server based applications to allow online shopping, online transactions between merchants and online electronic payments. With the explosive development of the Internet, e-commerce is increasingly widespread. However, due to the development of supply chain and logistics, the types and quantities of goods on the Internet are so great that it greatly increases the time cost of consumer shopping, reduces the sales conversion rate of e-commerce platforms. Clearly, consumers do not want to spend too much time in searching the Internet for endless merchandises. Furthermore, online shopping does not allow shoppers to check the quality of the goods, as in real life. Shoppers desire an automatic recommendation system which can make suggestions according to their own interests and satisfaction. Targeting personal recommendations according to the different user profiles or by clustering users into different user groups, is one of the current trending applications.

In the prior art, user clustering is based on a sequence of webpage hits from user access paths or user search keywords. Because user access is generally repeated and interrupted, each visitor's click path cannot be exactly the same every time. As a result, the existing technology is unable to balance the differences caused by multiple user visits, resulting in poor user clustering effect and inefficient service.

Therefore, there is currently a pressing need to solve the following technical problem: providing personalized service recommendations, which can accurately measure the correlation between users to form an effective and accurate user group, and provide targeted services with improved efficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure provides a method and an apparatus for extracting user characteristics based on user behavior. The method uses a computer system to obtain webpage clickstream data of a current user, compute a click path correlation between the current user and other users using the clickstream data, and select X other users whose click path correlation with the current user ranks among the highest, where X is a positive integer. The method configures a comprehensive weight in connection to each of preset tags of webpages visited by the selected X other users, and computes a user correlation between the current user and the X other users based on the preset tags and the comprehensive weights.

In some embodiments, the method is further characterized in that the clickstream data has a plurality of clickstream data points, each clickstream data point including a user identifier, a current webpage, a source webpage, a click time and a length of stay. To compute the click path correlation between the current user and the other users, the method divides the plurality of clickstream data points into one or more sessions, wherein difference between the click times of any two adjacent sessions sequentially sorted by their respective click times is less than or equal to a first preset time threshold, and generates a clickstream path tree in each session using the respective current webpage and its source webpage. The clickstream path tree includes a node and a path, where the node is the current webpage, and the path indicates a connection between the current webpage and its source webpage. The method then generates a weighted-directed graph by merging the clickstream path trees, assigning a hierarchical weight to each merged node, and assigning a proportional weight to each merged path, selects Y other users who share the most common paths with the current user, wherein Y is a positive integer, and computes the click path correlation between the current user and the Y other users, using the weighted-directed graph.

The hierarchical weight to each merged node may be determined according to an average length of stay of the node, while the proportional weight to each merged path may be determined according to a respective pageview number pυ. The average length of stay is calculated by dividing a total length of stay of the node by a total number of pageviews of the node, where the totals are summed over the plurality of clickstream data points.

Assigning of a hierarchical weight to each merged node may be done by placing the node into one of the plurality of weight levels divided according to the average lengths of stay of the nodes, and assigning the hierarchical weight to the node according to the weight level to which the node is placed.

Each node may be a root node or a child node, and generating the clickstream path tree using the current webpage and the source webpage may be done by matching the source webpage of a current clickstream data point of the plurality of clickstream data points with the current webpage of another clickstream data point of the plurality of clickstream data points having a click time prior to that of the current clickstream data point, according to a preset matching criterion. If the matching is successful, the method makes the current webpage of the current clickstream data point a child node of the current webpage of the other matched clickstream data point. If the matching is unsuccessful, the method generates a new clickstream path tree using the current webpage of the current clickstream data point as the root node thereof.

The preset matching criterion may include a preset maximum matches, and/or a preset maximum difference between the click times of the current clickstream data point and the matching clickstream data point.

In one embodiment, the weighted-directed graph is defined by:

$$U=\{\ldots,<u_i,\lambda_i>,\ldots,<u_j,\lambda_j>,\ldots\},$$

where $<u_i,\lambda_i>$ represents webpage $u_i$ and its user clicking status, $u_i$ is the current webpage visited by the user, and $\lambda_i$ is the hierarchical weight of webpage $u_i$; and, $$T=\{\ldots,<u_i,u_j,\delta_{ij}>,\ldots,<u_i,u_k,\delta_{ik}>,\ldots\}$$

where $<u_i, u_j, \delta_{ij}>$ represents a user click path direction from webpage $u_j$ to webpage $u_i$, $u_i$ is the current webpage, $u_j$ is the source webpage, and $\delta_{ij}$ is the proportional weight of the respective user click path direction.

The click path correlation between the current user and the Y other users may be computed using the following equation:

$$\text{correlation} = \frac{\Sigma \text{Minimum weights of common paths}}{\Sigma \text{Weights of noncommon paths} + \Sigma \text{Maximum weights of common paths}}$$

where, the minimum weight of a common path is a multiplication product of the minimum value of the proportional weight of the common path×the minimum value of the hierarchical weight of the current webpage indicated in the common path×the minimum value of the hierarchical weight of the source webpage indicated in the common path; the maximum weight of a common path is a multiplication product of the maximum value of the proportional weight of the common path×the maximum value of the hierarchical weight of the current webpage indicated in the common path×the maximum value of the hierarchical weight of the source webpage indicated in the common path; and the weight of a non-common path is a multiplication product of the value of the proportional weight of the non-common path×the value of the hierarchical weight of the current webpage indicated in the non-common path×the value of the hierarchical weight of the source webpage indicated in the non-common path.

Each webpage has a page weight, each preset tag on each webpage has an original weight, and based on these original weights, the comprehensive weight of the preset tag may be computed using the equation:

$$\vec{w} = \sum_{i=0}^{\sigma k}(w_i \times pv_i \times wp_i) / \sum_{i=0}^{\sigma k} pv_i$$

where, $\vec{w}$ is the comprehensive weight of the preset tag, σk is the total number of webpages on which the preset tag appears, $w_i$ is the page weight of a webpage i, $pv_i$ is the total number of page views of the webpage i, $wp_i$ is the preset tag's original weight on the webpage i.

Furthermore, the user correlation between the current user and X other users may be computed using the question:

$$Sim(i, j) = \frac{K(\vec{Y}_i, \vec{Y}_j)}{\sqrt{K(\vec{Y}_i, \vec{Y}_i)}\sqrt{K(\vec{Y}_j, \vec{Y}_j)}} = \frac{\sum_{n=1}^{k}(\vec{w}_{in} \times \vec{w}_{jn})}{\sqrt{\sum_{n=1}^{k} \vec{w}_{in}^2}\sqrt{\sum_{n=1}^{k} \vec{w}_{jn}^2}}$$

where, $Sim(i,j)$ is the user correlation between user i and user j, each user is represented by a respective vector $\vec{Y}=\{(\sigma_1, \vec{w}_1), (\sigma_2, \vec{w}_2), \ldots, (\sigma_k, \vec{w}_k)\}$, σ represents a preset tag, and $\vec{w}$ represents the comprehensive weight of the particular preset tag.

Another aspect of the disclosure is a method for making personalized recommendations based on user behavior. The method obtains user information including the user identifier and selects Z other users who have a user similarity to the user ranked among the highest, where Z is a positive integer. The method then makes a recommendation to the user based on information of the selected Z other users. The user similarity is computed by a process is described in the above methods, which includes obtaining webpage clickstream data of the user; computing a click path correlation between the user and other users, using the clickstream data; selecting X other users whose click path correlation with the current user ranks among the highest, where X is a positive integer; configuring a comprehensive weight in connection to each of preset tags of webpages visited by the selected X other users; and computing a user correlation between the current user and the X other users based on the preset tags and the comprehensive weights.

Yet another aspect of the disclosure is a computer-based apparatus for user feature extraction based on user behavior. The apparatus includes a computer having a processor, computer-readable memory and storage medium (such as computer-readable media), and I/O devices, where the computer is programmed to have functional modules including:

a clickstream data acquisition module for obtaining webpage clickstream data of a current user;

a click path correlation computation module for computing a click path correlation between the current user and other users, using the clickstream data;

a first selection module for selecting X other users whose click path correlation with the current user ranks among the highest, where X is a positive integer;

a comprehensive weight configuration module for configuring a comprehensive weight in connection to each of preset tags of webpages visited by the selected X other users; and a user correlation computation module for computing a user correlation between the current user and the X other users based on the preset tags and the comprehensive weights.

In some embodiments, the computer-based apparatus is further characterized in that the clickstream data has a plurality of clickstream data points, each clickstream data point including a user identifier, a current webpage, a source webpage, a click time and a length of stay, wherein the click path correlation between the current user and the other users computed using a method described herein. For example, the computer-based apparatus may divide the plurality of clickstream data points into one or more sessions, wherein the difference between the click times of any two adjacent sessions sequentially sorted by their respective click times is less than or equal to a first preset time threshold; generate a clickstream path tree in each session using the respective current webpage and its source webpage, where the clickstream path tree includes a node and a path, the node being the current webpage, and the path indicates a connection between the current webpage and its source webpage; generate a weighted-directed graph by merging the clickstream path trees, assigning a hierarchical weight to each merged node, and assigning a proportional weight to each merged path; select Y other users who share the most common paths with the current user, wherein Y is a positive integer; and compute the click path correlation between the current user and the Y other users, using the weighted-directed graph.

Likewise, the hierarchical weight to each merged node may be determined according to an average length of stay of the node, and the proportional weight to each merged path may be determined according to a respective pageview number pυ. The average length of stay is calculated by dividing a total length of stay of the node by a total number of pageviews of the node, where the totals are summed over the plurality of clickstream data points.

A module may also be programmed to assign a hierarchical weight to each merged node by placing the node into one of the plurality of weight levels divided according to the average lengths of stay of the nodes, and assigning the hierarchical weight to the node according to the weight level to which the node is placed.

In some embodiments, each node may be a root node or a child node, and a module may be programmed to generate the clickstream path tree using the current webpage and the source webpage by matching the source webpage of a current clickstream data point with the current webpage of another clickstream data point having a click time prior to that of the current clickstream data point. The matching is performed according to a preset matching criterion. If the matching is successful, the module makes the current webpage of the current clickstream data point a child node of the current webpage of the other matched clickstream data point; and if the matching is unsuccessful, the module generates a new clickstream path tree using the current webpage of the current clickstream data point as the root node thereof.

In some embodiments, the weighted-directed graph is defined by:

$$U=\{\ldots,<u_i,\lambda_i>,\ldots,<u_j,\lambda_j>,\ldots\},$$

where $<u_i, \lambda_i>$ represents webpage $u_i$ and its user clicking status, $u_i$ is the current webpage visited by the user, and $\lambda_i$ is the hierarchical weight of webpage $u_i$; and, $$T=\{\ldots,<u_i,u_j,\delta_{ij}>,\ldots,<u_i,u_k,\delta_{ik}>,\ldots\}$$

where $<u_i, u_j, \delta_{ij}>$ represents a user click path direction from webpage $u_i$ to webpage $u_j$, $u_i$ is the current webpage, $u_j$ is the source webpage, and $\delta_{ij}$ is the proportional weight of the respective user click path direction.

In one embodiment, the click path correlation between the current user and the Y other users is computed using the following equation:

$$\text{correlation} = \frac{\Sigma \text{Minimum weights of common paths}}{\Sigma \text{Weights of noncommon paths} + \Sigma \text{Maximum weights of common paths}},$$

where, the minimum weight of a common path is a multiplication product of the minimum value of the proportional weight of the common path×the minimum value of the hierarchical weight of the current webpage indicated in the common path×the minimum value of the hierarchical weight of the source webpage indicated in the common path; the maximum weight of a common path is a multiplication product of the maximum value of the proportional weight of the common path×the maximum value of the hierarchical weight of the current webpage indicated in the common path×the maximum value of the hierarchical weight of the source webpage indicated in the common path; and the weight of a non-common path is a multiplication product of the value of the proportional weight of the non-common path×the value of the hierarchical weight of the current webpage indicated in the non-common path×the value of the hierarchical weight of the source webpage indicated in the non-common path.

In some embodiments, each webpage has a page weight, each preset tag on each webpage has an original weight, and computer-based apparatus is programmed to compute the comprehensive weight of the preset tag based on these original weights using the equation:

$$\vec{w} = \sum_{i=0}^{\sigma k}(w_i \times pv_i \times wp_i) / \sum_{i=0}^{\sigma k} pv_i$$

where, $\vec{w}$ is the comprehensive weight of the preset tag, σk is the total number of webpages on which the preset tag appears, $w_i$ is the page weight of a webpage i, $pv_i$ is the total number of page views of the webpage i, and $wp_i$ is the preset tag's original weight on the webpage i.

The computer-based apparatus may be further programmed to compute the user correlation between the current user and X other users using the question:

$$Sim(i,j) = \frac{K(\vec{Y}_i, \vec{Y}_j)}{\sqrt{K(\vec{Y}_i, \vec{Y}_i)}\sqrt{K(\vec{Y}_j, \vec{Y}_j)}} = \frac{\sum_{n=1}^{k}(\vec{w}_{in} \times \vec{w}_{jn})}{\sqrt{\sum_{n=1}^{k} \vec{w}_{in}^2}\sqrt{\sum_{n=1}^{k} \vec{w}_{jn}^2}}$$

where, Sim(i,j) is the user correlation between user i and user j, each user being represented by a respective vector $\vec{Y}=\{(\sigma_1, \vec{w}_1), (\sigma_2, \vec{w}_2), \ldots, (\sigma_k, \vec{w}_k)\}$, σ represents a preset tag, and $\vec{w}$ represents the comprehensive weight of the particular preset tag.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

In order to facilitate understanding of the above purpose, characteristic and advantages of the present disclosure, the present disclosure is described in further detail in conjunction with accompanying figures and example embodiments. In the description, the term "technique(s)," for instance, may refer to method, apparatus device, system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

Figure 1:
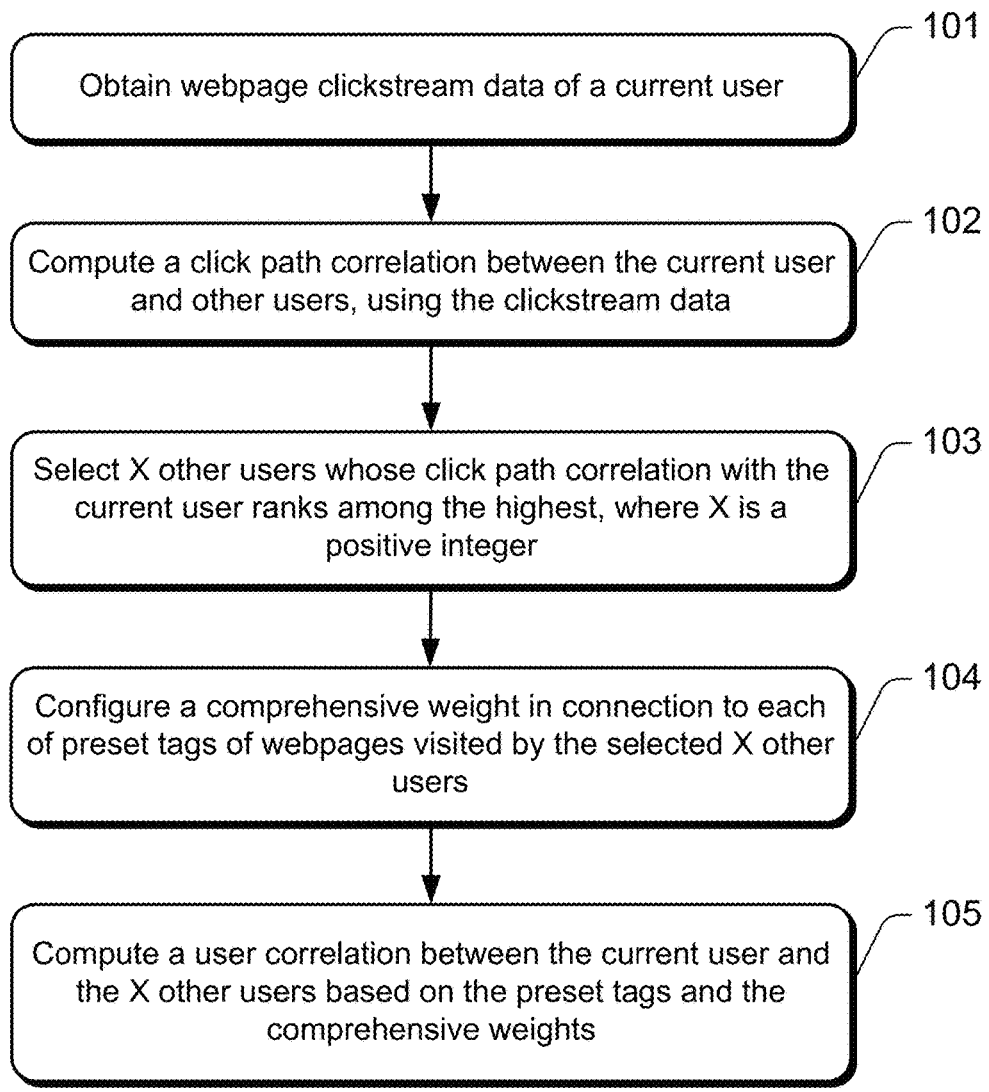
FIG. 1 is a block flow diagram of a disclosed method for extracting user features based on user behavior.

FIG. 1 is a block flow diagram of an embodiment of the method for extracting user features based on user behavior. The illustrative embodiment includes the following acts described in blocks.

At block 101, the computer-based system is used to obtain webpage clickstream data of a current user.

It should be noted that clickstream data may come from website logs, which are used to record user's website browsing and clicking behaviors, while the clickstream data may represent a traced path of a user browsing webpages. The webpages visited by a user may be from a single website, but may also be from different websites, such as when a cross-platform service is provided across multiple websites. Such variations are not limited in the present disclosure.

In specific applications, clickstream data may be a website log of an Apache server, which captures original clickstream data during an interval or multiple intervals. The clickstream data may include the IP address visited by the user, entry page (the current page being visited), a referrer page (the source page of the current page), the click time of the current page when the user visited, HTTP codes, HTTP traffic, HTTP response time, browser (or user agent) characteristics, unique cookie ID of the visiting user, etc.

An example of a clickstream data is as follows:
61.18.186.132 - - - [23/Feb/2013:00:00:03+0800]"GET /search.china.alibaba.com/business/k-300_y.html HTTP/1.1" 200 20406 275420 "/search.china.alibaba.com/business/k-300_sortPromotion-false_n-y.html" "Mozilla/4.0 (compatible; MSIE 8.0; Windows NT 5.1; Trident/4.0; .NET CLR 1.1.4322; .NET CLR 2.0.50727)" 61.15.72.11.1305814706754.4 "a=; b=mid=wold; c=c_key=300|c_sefilter=0"-

The server collects user visiting log records, and may obtain, from time to time (e.g., periodically) clickstream data from the log records. The periodical intervals for obtaining clickstream data may be hourly, or daily, or even real-time, with no restriction.

Frequently, the user visiting a website may go backward, switch pages, return to the homepage, or directly click on a page link. As a result, the user visiting path may be arbitrary and disorderly.

Upon obtaining the original clickstream data of a user visiting the webpages, the system may process the data, and output for each user a structured clickstream data $\Psi=\{V_1, V_2, \ldots, V_i \ldots, V_{\psi_n}\}$, where $\psi_n$ represents the total number of current users, while $V_i$ is the clickstream data of the ith user.

The preprocessing may include data cleaning of the original clickstream data, such as filtering out garbled data and internal visits within the company of the website, or other invalid general records.

A structured clickstream data may include a user identifier, a current webpage, a source webpage, a click time, and the length of stay, etc.

An example of these structured clickstream data is as follows:
IP=61.18.186.132
DATE TIME=23/Feb/2013:00:00:03
ENTRY=/search.china.alibaba.com/business/k-300\xd4\xaa\xca\xce\xc6\xb7\xbb\xec\xc5\xfa_p-3_offset-7_sortPromotion-false_n- y.html
REFERER=/search.china.alibaba.com/business/k-300%D4%AA%CA%CE%C6%B7%BB%EC%C5%FA_p-2_offset-7_sortPromotion-false_n-y.html
COOKIE ID=61.15.72.11.1305814706754.4

It is noted that the user identifier may be an IP address, a cookie ID, and/or an agent, as long as the user identifier can have an effect of labeling the user. This disclosure does not have any restriction in this regard. The current webpage is the webpage being visited by the user during the visit. The source webpage is the source page from which the visit to the current webpage comes. For example, if a user clicks on the link on a webpage A and goes to webpage B, then A is the source webpage, while B is the current webpage. On a special occasion, if the user visits a webpage by directly inputting the link or URL of the current webpage to be visited, this current webpage would not have a source webpage, and in this case the source webpage is null.

Click time is the time when the user visited the current page. The length of the stay is the duration which the current webpage is browsed by the user.

At block 102, the system computes a click path correlation between the current user and other users, using the clickstream data.

It is noted that a click path of webpages being visited is a track of the user browsing webpages, and reflects to an extent a behavioral tendency or inclination of the user. The correlation, or similarity represents the extent two users are related. Two users who have a high degree of correlation have a better chance to be interested in the same or similar things.

In practice, clickstream data available on the server may include multiple clickstream data points, which each may include a user identifier, a current webpage, a source webpage, a click time, and the length of stay, etc.

Block 102 may include the following steps.

Step S11 divides the clickstream data points into one or multiple sessions. The difference between the click times of any two adjacent sessions sequentially sorted by their respective click times is less than or equal to a first preset time threshold. Specifically, clickstream data points may be arranged sequentially according to the order of the respective click times. If the difference between the click times of two consecutive clickstream data points is less than or equal to the first preset time threshold, the two clickstream data points may be merged into one session.

The clickstream data after being divided into sessions may be expressed as:

$$\zeta = \{l_1, l_2, \ldots, l_i \ldots, l_{\zeta n}\}$$

where clickstream data of user $\zeta$ is divided into $\zeta n$ sessions, $l_i$ is ith session. Both $\zeta n$ and i are positive integers.

In one preferred embodiment, the first preset time threshold is set to be 30 min.

In step S12, for each session, the system establishes a clickstream path tree using the current webpage and the source webpage. The clickstream data point path tree includes a node and path. The node is the current webpage, while the path indicates a connection between the current webpage and its source webpage.

The clickstream path tree is a representation of the track of the user visiting webpages.

In some embodiments, the node may be either a root node or a child node. Accordingly, step S12 may further include the following sub-steps.

Sub-step S121 matches the source webpage of the current clickstream data point with the current webpage of another clickstream data point that has a click time prior to that of the current clickstream data point. The matching may continue until a preset matching criterion is met. If the matching is successful, the system performs sub-step S122; if unsuccessful, the system performs sub-step S123.

The matching may observe two principles, one of them requiring the referrer page (the source page) of the current clickstream data point to be the same as the entry page (the current page) of the previous clickstream data point.

In practice, multiple clickstream data points are ordered sequentially according to the click times. Starting from the last clickstream data point (which has the most recent click time), match up to the other clickstream data points which have an earlier click time, until the matching arrives at the first clickstream data point of the session.

The current webpage and the source webpage may be in the form of a URL Universal Resource Locator), which may have various lengths. During matching, characteristic streams may be generated based on the original URL or other identifying information to improve matching and reduce the size of persistent storage needed.

For example, if the length of the URL has 16 or fewer characters, the URL may be used for direct matching. But if the length of the URL is greater than 16 characters, MD5 (Message-Digest Algorithm 5) algorithm may be used to generate a 16 character string, which is then used for matching.

For example, based on the following URL: http://sale.suning.com/images/advertise/zyn/130722jiuyang/index.html?utm_source=union&utm_medium=C&utm_campaign=1028&utm_content=1027, MD5 algorithm is used to generate the following 16 character string: B11A4C0B627B8FE4.

The above illustrated method for generating shorter characteristic streams is only for the purpose of illustration. In practice, any other suitable method may be used to achieve a similar purpose. This disclosure has no restriction in this regard.

Another matching principle is time proximity, which looks for a successful match closest in time between the two matching clickstream data points.

For example, in the example Session S1, the user visits webpage A, stays there for 5 seconds, clicks from webpage A onto webpage B and stays there for 2 seconds, then clicks from webpage B onto webpage C and stays there for 3 seconds, then clicks from webpage C onto webpage E and stays there for 7 seconds, and subsequently clicks from webpage B onto webpage D, stays there for 3 seconds, clicks from webpage D to webpage C and stays there for 1 second, and then clicks from webpage C onto webpage E, stays there for 5 seconds.

The above clickstream data belongs to the same session, which can be expressed according to the actual click track of the user as: A→B→C①→E①→D→C②→E②, where C① and C② represent the first visit and the second visit to websites C respectively, while E① and E② represent the first visit and the second visit to website E, respectively.

Using E② as the current page to match upward, one will find C① and C②. However, because the click time of C② is the closest to the click time of E②, C② is considered a successful match.

Step S122 takes the current page of the current clickstream data point to be a child node of the current page of the new clickstream data point that is successfully matched. Relatively speaking, the current page of the successfully matched new clickstream data point may be called the parent node of the child node.

As the parent node and the child node are successfully matched, a path indicating the visiting track from a source page (parent node) to a current page (child node) also emerges.

Step S123 generates a new clickstream path tree using the current webpage of the current clickstream data point as the root node.

For another example, in the example Session S1, if matching using the webpage A's clickstream data point fails, the system generates a new clickstream path tree using webpage A as the parent node.

In the above, criteria for the matching in step S121 to stop may be preset, and may include the following conditions:

Condition one: there is no more matching if the number of matches has exceeded a preset maximum threshold number. The preset threshold number may be determined by a technician according to the actual application conditions and requirements, and this disclosure does not have any restrictions in this regard. In one example, the threshold number is set to be 5000, and if the number of matches exceeds this number, the clickstream data point is considered to be a result of machine visiting, which is usually done by a special software designed to repetitively visit a certain website in order to increase the click traffic, and is not considered normal.

Condition two: there is no matching if the difference between the click times of the current clickstream data point and the new matching clickstream data point is greater than a second time threshold. This second time threshold may be used to determine whether the matching in step S121 should be terminated.

Likewise, the above second time threshold may be determined by a technician depending on the application conditions and requirements, and is not restricted in this disclosure. In one preferred embodiment, the second time threshold is set to be 30 min.

In another embodiment, block S12 may include the following steps.

Step S124 removes any isolated nodes, which are clickstream path trees containing just a single node. In an isolated node, the single node is both a parent node and a child node.

The clickstream path tree in a session is determined after the matching is done.

Figure 2:
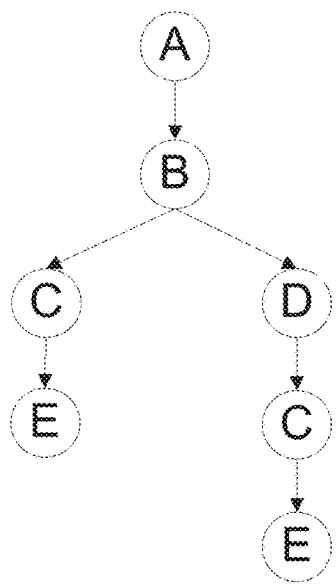
FIG. 2 is an illustrative diagram of a clickstream path tree of the first example session (S1) of the disclosure.

For Session S1, an exemplary representation of a clickstream path tree is illustrated in FIG. 2. It is noted that a clickstream path tree may be represented using other methods.

For example, the clickstream path tree may be expressed using preorder traversal output as:

$$l=\{<v_1,p_1,t_1> \ldots,<v_i,p_i,t_i>,\ldots,<v_{ln},p_{ln},t_{ln}>\} \quad \text{equation (1)}$$

where, l represents the clickstream path tree, which has ln nodes; $<v_i,p_i,t_i>$ is the ith clickstream data point, $1 \leq i \leq ln$, ln and i are both positive integers; $v_i$ is the current webpage, $p_i$ is the source page of $v_i$, $t_i$ the lengths of stay visiting $v_i$. In particular, when i=1 the node is the root node of the clickstream path tree l. Because this root node has no real source page (that is, no parent node), its symbolic source page is represented by "-", that is, $p_1$="-".

For example, in Session S1, the above equation (1) may be expressed as: l={<A,-,5>,<B,A,2>,<C,B,3>,<E,C,7>, <D,B,3>,<C,D,1>,<E,C,5>}

In the above type of representation, the path in the clickstream path tree is not intuitively shown.

Step S13 merges clickstream path trees. Specifically, the system merges the available clickstream path trees, configures weights, and constructs a weighted-directed graph model for the user website click path.

It should be noted that merging clickstream path trees may be done with respect to all nodes. Clickstream path trees that have the same nodes may be merged according to these same nodes. For clickstream path trees that do not share a common node, merging is even simpler because there is no tree-tree relationship needs to be considered. But this is only one special case of merging clickstream path trees.

Figure 3:
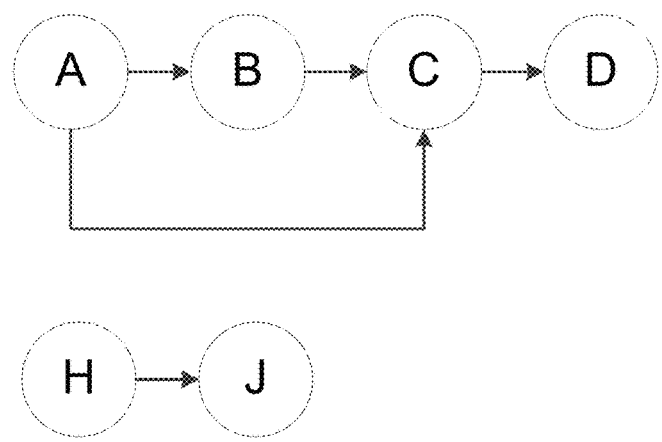
FIG. 3 is an illustrative diagram of merging clickstream path trees according to a second example session (S2) of the disclosure.

For example, suppose a Session S2 has three clickstream path trees, specifically A→B→C→D, A→C→D and H→J, where A-D, H and J each represents a different webpage, while the arrows each represents a path. The path trees A→B→C→D and A→C→D may be merged, while H→J remains the same after merging. The measure result is shown in FIG. 3.

Statistical analysis with regard to clickstream path trees can be done from different respects. For example, one may be done with regard to user webpage click status, and another with regard to webpage click directions. The former represents a dot in the graph while the latter represents an edge in the graph.

The user webpage click status usually accounts the number of page views pυ of a certain webpage by the user or users, and the average length of stay on the webpage. Intuitively, the number of page views pυ and the length of stays both reflect the level of interest by the user in the webpage. A greater pυ and a greater length of stay may indicate a great interest by the user in the webpage Webpage click directions may be used to describe a click tendency and its proportions. The user may exit after visiting the current page, or continue to click onto this and another page. Such directional information is generally useful.

Step S14 assigns a hierarchical weight to each merged node. The hierarchical weight to each combined node may be determined according to an average length of stay of the node, which is calculated by dividing a total length of stay of the node by a total number of pageviews of the node, where the totals are summed over the plurality of clickstreams.

Step S15 assigns a proportional weight to each merged path. The proportional weight to each merged path is determined according to its pageview numbers pυ, specifically by dividing the total number of page views of the source page of the current page in the merged path by the total number of page views of the current page clicked from the source page.

For example, suppose the merged path has a source page N and a current page M. If the total number of page views pυ of the source page N is 10, and the total number of page views of the current page M clicked from the source page N is 5, then the click path indicating the source page N and the current page M has a proportional weight of 5/10=0.5.

A current page may have multiple source pages. However, only one path may exist from each source page to a current page. That is, each path corresponds to a certain pair of a current page and a source page.

The user click condition may be described as:

$$U=\{\ldots,<u_i,pv_i,\overline{t_i}>,\ldots,<u_j,pv_j,\overline{t_j}>,\ldots\} \quad \text{equation (2)}$$

where $u_i$ is the ith current page, $u_i$ and i both being positive integers, $pv_i$ is the total page views of $u_i$, and $\overline{t}$ is average length of stay of $u_i$, and, $$T=\{\ldots,<u_i,u_j,pv_{ij}>,\ldots,<u_i,u_k,pv_{ik}>,\ldots<u_j,u_k, pv_{jk}>,\ldots\} \quad \text{equation (3)}$$

where, $<u_i,u_j,pv_{ij}>$ represents that the total page views clicked from source page $u_j$ to current page $u_i$ is $pv_{ij}$.

Using equation (2), the above-mentioned Session S1 may be expressed by:

$$U=\{<u_A,1,5>,<u_B,1,2>,<u_C,2,2>,<u_D,1,3>,<u_E,2,6>\}$$

Using equation (3), the Session S1 may be expressed by:

$$T=\{<u_A,u_B,1>,<u_B,u_C,1>,<u_C,u_E,2>,<u_D,u_C,1>\}$$

Considering that different users have different reading speeds, some faster and some slower, the average length of stay is weighted and ranked hierarchically according to the user. For example, K different hierarchical ranks (where K is a positive integer) may be used. Examples of K are 7 and 13.

Accordingly, equation (2) maybe converted to:

$$U=\{\ldots,<u_i,pv_i,\lambda_i>,\ldots,<u_j,pv_j,\lambda_j>,\ldots\} \quad \text{equation (4)}$$

where, $u_i$ is the ith current webpage, $pv_i$ is the total page views of $u_i$, and $\lambda_i$ is $u_i$ hierarchical weight.

In one embodiment, the above step S14 may include the following sub-steps.

Sub-step S141 ranks the node using a plurality of weight levels divided according to the average length of stay of the node.

Sub-step S141 assigns a hierarchical weight to each weight level.

For example, the clickstream path tree of the above Session S1 may be divided into K=5 weight levels, each given the hierarchical weight as follows:

$$\lambda_1=1.02, \lambda_2=1.01, \lambda_3=1, \lambda_4=0.99, \lambda_5=0.98.$$

In practice, clickstream data points are ordered sequentially based on its average length of stay, from the longest to shortest, and are equally divided into five regions, each region corresponding to a weight level. The websites in the first region are given a hierarchical weight $\lambda_1$, the websites in the second region are given the hierarchical weight $\lambda_2$, and so on.

In this case, Session S1 may be expressed using equation ④ as:

$$U=\{<u_A,1,1.01>,<u_B,1,0.99>,<u_C,2,0.99>,<u_D,1,1>, <u_E,2,1.02>\}$$

When configuring proportional weights, it may be taken into consideration that a current webpage $u_i$ maybe a child node in the clickstream path tree, and could be visited directly. In this case, $\Sigma pv_{ij} \leq pv_j$. Accordingly, $pv_{ij}/pv_j$ is the ratio of clicks diverting from $u_j$ to $u_i$, the ratio being denoted as $\delta_{ij}$, namely a proportional weight, where $pv_j$ is the total page views of $u_j$. In this case, $\delta_{ij} \leq 1$. The special situation where i=j indicates clicks directed from $u_i$ to itself $u_i$, where the ratio is denoted as $\delta_{ii}$.

Step S16 generates a weighted-directed graph.

In one embodiment, the click status of a webpage may be expressed by combining equation ③ and equation ④, to have:

$$U=\{\ldots,<u_i,\lambda_i>,\ldots,<u_j,\lambda_j>,\ldots\} \quad \text{equation ⑤}$$

where, $<u_i, \lambda_i>$ is the user click condition of webpage $u_i$ (the current webpage being visited), $\lambda$ is hierarchical weight, and $u_i$ is the ith current page, $\lambda_i$ is the hierarchical weight of $u_i$;

and, $$T=\{\ldots,<u_i,u_j,\delta_{ij}>,\ldots,<u_i,u_k,\delta_{ik}>,\ldots\} \quad \text{equation ⑥}$$

where, $<u_i, u_j, \delta_{ij}>$ is a click path of a user clicking from webpage $u_j$ to webpage $u_i$, $u_i$ being the current webpage, $u_j$ the source webpage, $\delta_{ij}$ is proportional weight. $\delta_{ij}$ indicates that, of the clicks from the source webpage $u_j$, a ratio of $\delta_{ij}$ were directed to the current webpage $u_i$.

User's webpage weighted-directed graph may be generated using the above equation ⑤ and equation ⑥. For example, the above Session S1 may be expressed using equation ⑤ as:

$$U=\{<u_A,1.01>,<u_B,0.99>,<u_C,0.99>,<u_D,1>,<u_E, 1.02>\}$$

Session S1 may be expressed using equation ⑥ as:

$$T=\{<u_A,-,1>,<u_B,u_A,1>,<u_C,u_B,0.5>,<u_D,u_B, 0.5>,<u_C,u_D,1>,<u_E,u_C,1>\}$$

Figure 4:
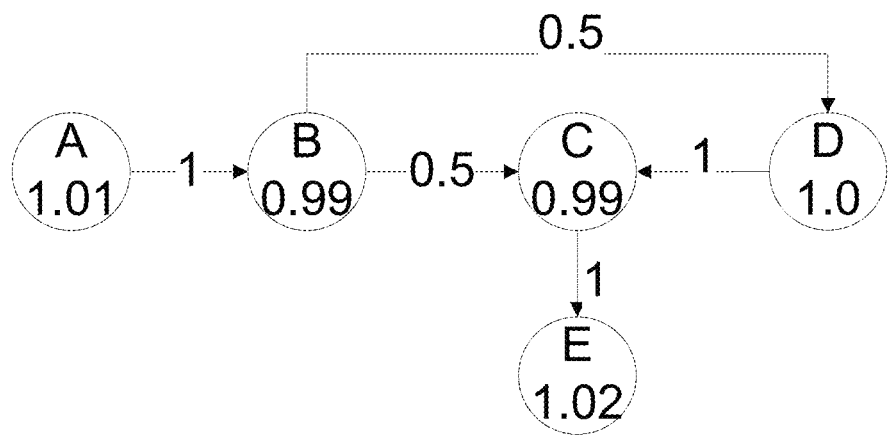
FIG. 4 is an illustrative diagram of a weighted-directed graph according to the first example session (S1) of the disclosure.

FIG. 4 shows a webpage weighted-directed graph of Session S1 as a result of the above descriptions. The webpage weighted-directed graph has both hierarchical weights and proportional weights configured.

As illustrated above, the clickstream data of a user can be converted to a weighted-directed graph model based on the descriptions of the above equation ⑤ and equation ⑥. A different user may have a different weighted-directed graph which is converted from the user's own clickstream data. As a result, the matter of computing the correlation of two users is converted to that of computing the correlation of the weighted-directed graphs of the same users.

At step S17, the system selects Y other users who share the highest number of common paths with the current user, where Y is a positive integer. When two users each has a path which have the same current webpage and the same source webpage, the two users are considered to share a common path.

In one embodiment, Y=3N, where N is a positive integer, the meaning of which will become clear in the descriptions below.

Figure 5:
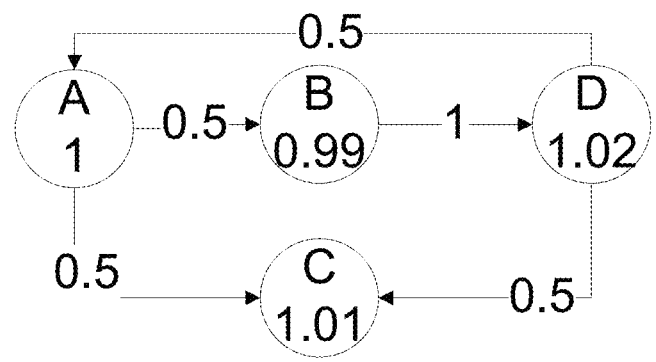
FIG. 5 is an illustrative diagram of a weighted-directed graph according to a third example session (S3) of the disclosure.

FIG. 5 shows a webpage weighted-directed graph of another session described above, namely Session S3. A comparison between the weighted-directed graph of Session S3 with that of Session S1 shows that the two graphs share three common paths: A→B, B→D and D→C.

Step S18 uses the weighted-directed graphs of the users to compute the webpage visiting path correlations between the current user and the above described selected Y other users.

The first task of computing the correlation of weighted-directed graphs is to find the number of common paths shared by the graphs. For two different users, the more common paths they share, the more overlap there is between their weighted-directed graphs, suggesting the higher correlation between the two users. At the same time, the higher the weights of the common paths and their nodes are, the higher the user correlation would be.

In one preferred embodiment, the click path correlation between the current user and the selected Y other users is calculated using the following equation:

$$\text{correlation} = \frac{\Sigma \text{Minimum weights of common paths}}{\Sigma \text{Weights of noncommon paths} + \Sigma \text{Maximum weights of common paths}}$$

where, the minimum weight of a common path is a multiplication product of the minimum value of the proportional weight of the common path×the minimum value of the hierarchical weight of the current webpage indicated in the common path×the minimum value of the hierarchical weight of the source webpage indicated in the common path; the maximum weight of a common path is a multiplication product of the maximum value of the proportional weight of the common path×the maximum value of the hierarchical weight of the current webpage indicated in the common path×the maximum value of the hierarchical weight of the source webpage indicated in the common path; and the weight of a non-common path is a multiplication product of the value of the proportional weight of the non-common path×the value of the hierarchical weight of the current webpage indicated in the non-common path×the value of the hierarchical weight of the source webpage indicated in the non-common path.

It should be noted that a common path of two users may have different proportional weights, and the current webpage and the source webpage of the common path of the two different users may also have different hierarchical weights. When calculating the correlation, the proportional weights and the hierarchical weights are taken at their face value, and there's no need to particularly note a certain value belongs to which user's weighted-directed graph.

Referring to FIG. 4 and FIG. 5, the webpage visiting correlation between two users is calculated as follows:

Common paths: A→B, B→D and D→C.

The minimum weight of the common paths is computed as: 0.5×1×0.99+0.5×0.99×1+0.5×1×0.99=1.485

The maximum weight of the common paths is computed as: 1×1.01×0.99+1×0.99×1.02+1×1.02×1.01=3.05

Non-common paths: FIG. 4 has B→C, C→E; while FIG. 5 has D→A, A→C.

The weight of the non-common paths in FIG. 4 is computed as: 0.5×0.99×0.99+1×0.99×1.02=1.500.

The weight of the non-common paths in FIG. 5 is computed as: 0.5×1.02×1+0.5×1×1.01=1.015.

Therefore, the correlation between the weighted-directed graphs in FIG. 4 and FIG. 5 is as follows:

$$1.485/(1.500+1.015+3.05)=0.267$$

The above process of computing the webpage visiting path correlation is only for the purpose of illustration. Other suitable methods for computing the path correlation may also be used according to the actual application needs. Examples of such methods for computing after relation include Cosine Correlation calculation, Pearson Correlation calculation, etc. The disclosure places no restriction in this regard.

At block 103, the system selects X other users whose click path correlation with the current user ranks among the highest, where X is a positive integer.

In one embodiment, X=2N, where N is a positive integer. Usually, the number X is smaller than number Y (=3N in the above illustrated example), because the X other users are selected from the pre-selected Y other users.

At block 104, the system configures a comprehensive weight in connection to each of preset tags of webpages visited by the selected X other users.

In practice, a webpage tag library may be built to collect the tags of various webpages. Each webpage may have one or more tags, each preset tag may have its own original weight.

A webpage may be described by a tag list as follows:

$$\vartheta=\{(\sigma_1,wp_1) \ldots (\sigma_i,wp_i) \ldots (\sigma_{\vartheta n},wp_{\vartheta n})\} \qquad \text{equation } \textcircled{7}$$

where, tag list $\vartheta$ has a total of $\vartheta n$ tags, $\sigma_i$ is the ith tag, $1 \leq i \leq \vartheta n$, $\vartheta n$ and i are both positive integers, and $wp_i$ is the original weight of the tag $\sigma_i$.

A tag item contains two elements, a tag and a tag weight. A tag may be an indicator of a webpage type, the keyword, a webpage classification, an ID etc., where the webpage type may be a homepage, a navigational page, the search page, a product homepage, a company homepage, a product description page, an order page, a logon page, etc.; and an ID may be a product ID, a company ID, an offer category (such as cosmetics) etc.

The above listed tags are only illustrative. In practice, any other tags may be used, as long as the tag identifies the characteristics of a website. This disclosure places no restriction in this regard.

Take an e-commerce webpage for selling routers, the following tags may be introduced:

product model=DIR-616
product brand=D-Link
product type=router
product ID=22540068533
seller name=dlink specialty store where, the left side of the equal sign is the name of the tag, the right side is the tag content.

As a result, the above website may be expressed as:

$$\vartheta=\{(\text{``DIR-616''},1)(\text{``}D\text{-Link''},0.5)(\text{``router''},0.3) \\ (\text{``22540068533''},1)(\text{``}d\text{link specialty store''},0.7)\}$$

where, the original weight of the product ID and the original weight of the product model are both 1, the original weight of the product brand is 0.5, the original weight of product type router is 0.3, while the original weight of the seller name is 0.7.

It is understood that the origin weights may be determined by technicians according to the application conditions, and this disclosure places no restriction in this regard.

In addition, a webpage may have an overall page weight. Using $u_i$ to represent a webpage, this webpage may be represented by the webpage weight and a tag list:

$$u_i=\{w_i,\vartheta_i\} \qquad \text{equation } \textcircled{8}$$

where, $w_i$ is the page weight of webpage $u_i$, $\vartheta_i$ is the tag list.

A comprehensive weight of a tag is computed using the following question:

$$\vec{w} = \sum_{i=0}^{\sigma k} (w_i \times pv_i \times wp_i) \Big/ \sum_{i=0}^{\sigma k} pv_i$$

Where, $\vec{w}$ is the comprehensive weight of the preset tag, $\sigma k$ is the total number of webpages in which the preset tag appears, $w_i$ is the page weight of the ith webpage, $pv_i$ is the total page views of the ith webpage, and $wp_i$ is the original weight of the preset tag in the ith webpag.

At block 105, the system computes a user correlation between the current user and the X other users based on the preset tags and the comprehensive weights.

Plugging equation $\textcircled{8}$ into equation $\textcircled{7}$, and combining with equation $\textcircled{2}$ results in a k-dimension tag weight vector space:

$$\textcircled{Y}=\{(\sigma_1,\vec{w}_1),(\sigma_2,\vec{w}_2),\ldots,(\sigma_k,\vec{w}_k)\}$$

where k is a positive integer, $\sigma$ is a tag, and $\vec{w}$ is the comprehensive weight of the respective tag.

Each tag is a dimension in the k-dimension tag weight vector space. A user in the k-dimension tag weight vector space is represented with a vector having comprehensive weights as vector coordinates in the respective tag dimensions. The calculation of the correlation between users is converted to calculating a distance between the representative vectors in the tag weight vector space.

In one embodiment, the user correlation between the current user and the X other users is computed based on the preset labels and the comprehensive weights using the following question:

$$Sim(i,j) = \frac{K(\vec{Y}_i,\vec{Y}_j)}{\sqrt{K(\vec{Y}_i,\vec{Y}_i)}\sqrt{K(\vec{Y}_j,\vec{Y}_j)}} = \frac{\sum_{n=1}^{k}(\vec{w}_{in} \times \vec{w}_{jn})}{\sqrt{\sum_{n=1}^{k}\vec{w}_{in}^2}\sqrt{\sum_{n=1}^{k}\vec{w}_{jn}^2}}$$

where, Sim(i,j) is the correlation between user i and user j, $\vec{Y}=\{(\sigma_1,\vec{w}_1),(\sigma_2,\vec{w}_2),\ldots,(\sigma_k,\vec{w}_k)\}$, $\sigma$ is a tag, and $\vec{w}$ is the comprehensive weight of the corresponding tag.

The above example of computing the user correlation is only for the purpose of illustration. Other suitable methods for computing the user correlation may also be used according to the actual application needs. Examples of such methods for computing after relation include Cosine Correlation calculation, Pearson Correlation calculation, etc. The disclosure places no restriction in this regard.

The user correlation to extend represents the similarity between the interests of different uses. Higher user correlation indicates a higher level of similarity between the user interests.

The present disclosure uses clickstream data to construct a weighted-directed graph model for the user website click paths, and converts the computation of user correlation to computation of a similarity of the weighted-directed graphs of different users. The present disclosure further introduces webpage tag library to incorporate the calculation of the webpage tag content correlation into user correlation. The disclosed method effectively discovers the user clicking habits and personalized behavior inclinations in order to improve the accuracy and efficiency of user clustering, which in turn improves the success rate and efficiency of user recommendations.

Configuring hierarchical weights to the nodes in the clickstream path tree reduces the influence of different users' reading habits and ability, and increases the accuracy of personalization.

Figure 6:
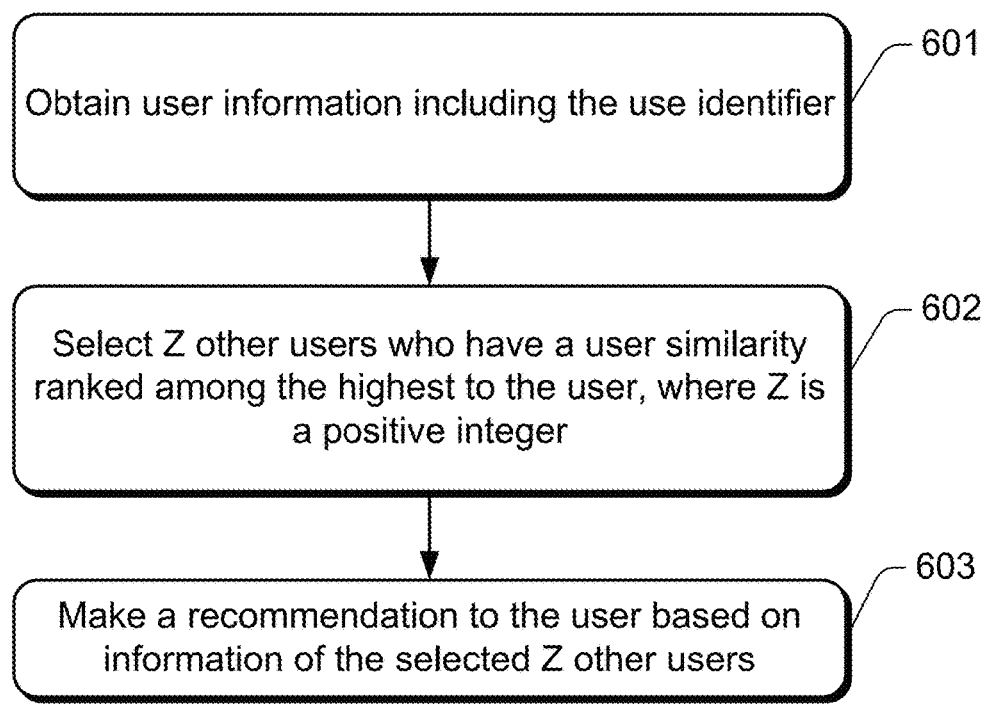
FIG. 6 is a block flow diagram of a process making personalized recommendations based on user behavior.

FIG. 6 is a block flow diagram of a process making personalized recommendations based on user behavior. The process is described in following blocks.

At block 601, the system obtains user information including the user identifier.

At block 602, the system selects Z other users who have a user similarity ranked among the highest to the user, where Z is a positive integer.

At block 603, the system makes a recommendation to the user based on information of the selected Z other users, where the user similarity is generated by a process described as follows:

obtaining webpage clickstream data of the user;

computing a click path correlation between the user and other users, using the clickstream data;

selecting X other users whose click path correlation with the current user ranks among the highest, where X is a positive integer;

configuring a comprehensive weight in connection to each of preset tags of webpages visited by the selected X other users; and computing a user correlation between the current user and the X other users based on the preset tags and the comprehensive weights.

Z is usually smaller than X. In one embodiment, Z=N, while X=2N, where N is a positive integer.

The user clustering may be preconfigured into the user information. As a user visits a website, the system may directly obtain the personalized recommendation information of the particular user based on the acquired user ID, thus improving the efficiency of computing resource usage and the efficiency of personalized recommendation.

As described, the method according to the present disclosure first selects Y other users who share the highest number of common paths with the current user, calculates the click path correlation between the current user and the selected other users, then selects X users who have the highest click path correlation with the current user, and then selects Z users who have the highest user correlation with the current user. The selection is layered, with each layer extracting the most relevant information for computation. This approach increases the accuracy, and decreases data processing demand and the usage of computational resources.

In practical applications, friend recommendations, blog recommendations, product recommendations, etc., may be made based on the recommendation information available for the selected X other users who have the highest correlation with the current user.

The rules and parameters such as the various preset thresholds may be set by a technician based on the actual needs of the application. For example, the user correlation may be calculated from time to time, or periodically, and the calculation may be based on either all or part of the available clickstream data. The clickstream data of some users may be limited to the data collected during a certain time interval or multiple intervals. The disclosure places no restriction in this regard.

In some embodiments, the system may have a blacklist and a white list to record those users who are currently untrusted and trusted. The blacklist and the white list may include users, blogs or products which are either recommended or not recommended.

The system may receive user feedback to the recommendations made by the system to the user, and use the feedback to adjust the original weights, website weights, and/or hierarchical weights.

The method used for extracting feature dimensions in the user clustering space is similar to that used for extracting user behavior characteristics, and such method is not repeated in this disclosure, and may refer to the relevant descriptions herein.

The above-described techniques may be implemented with the help of one or more computer-readable media containing computer-executable instructions. The computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically. As defined herein, the computer-readable media does not include transitory media such as modulated data signals and carrier waves, etc.

In connection to the method disclosed herein, the present disclosure also provides a computer-based apparatus for implementing the method described herein.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 7:
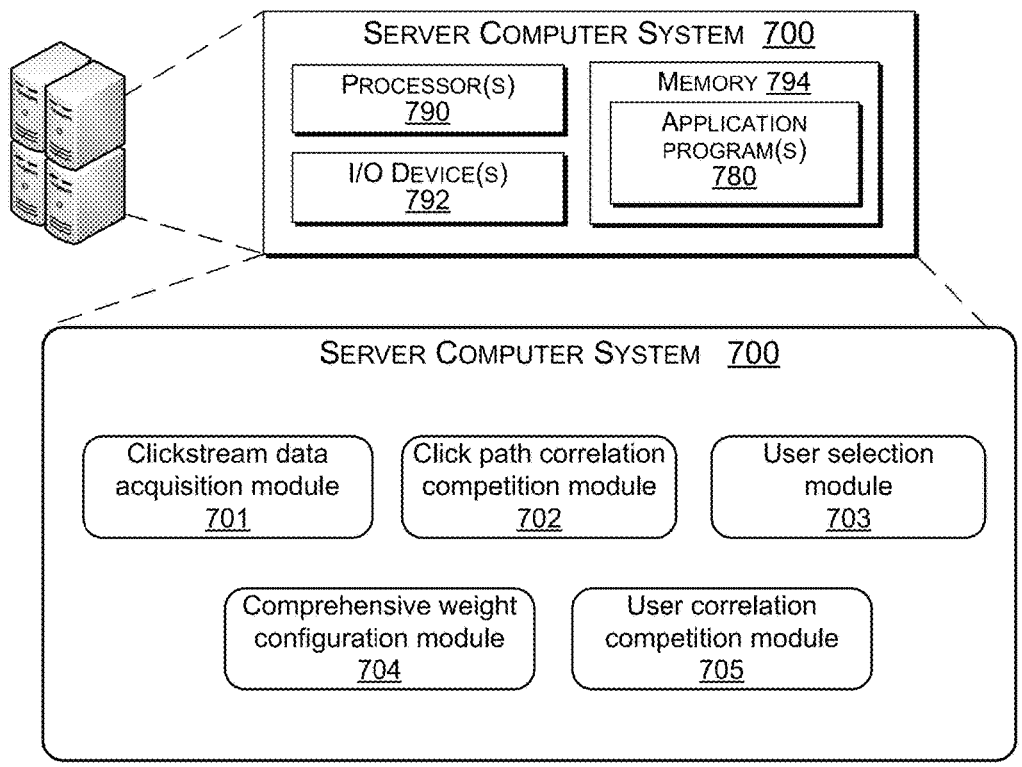
FIG. 7 is a block diagram of a system for extracting user features based on user behavior.

FIG. 7 is a schematic diagram of the function blocks of a server system implementing the method for exchanging information in interactive communications.

Server computer system 700 can be based on a typical smart phone hardware which has one or more processor(s) 790, I/O devices 792, computer-readable memory and storage medium 794 which stores application program(s) 780. Server computer system 700 is programmed to have the following functional modules.

A clickstream data acquisition module 701 is programmed for obtaining webpage clickstream data of a current user;

A click path correlation computation module 702 is programmed for computing a click path correlation between the current user and other users, using the clickstream data;

A user selection module 703 for is programmed selecting X other users whose click path correlation with the current user ranks among the highest, where X is a positive integer;

A comprehensive weight configuration module 704 is programmed for configuring a comprehensive weight in connection to each of preset tags of webpages visited by the selected X other users; and A user correlation computation module 705 is programmed for computing a user correlation between the current user and the X other users based on the preset tags and the comprehensive weights.

In practice, clickstream data available on the server may include multiple clickstream data points, which each may include a user identifier, a current webpage, a source webpage, a click time, and the length of stay, etc.

The modules are programmed to perform the functions of the methods described in this disclosure. Furthermore, the above modules may have programmed submodules to perform various functions as described herein in the context of the disclosed method. The details of these modules and submodules are not repeated.

For example, the click path correlation computation module 702 may include the following submodules.

A session division submodule divides the clickstream data points into one or multiple sessions. The difference between the click times of any two adjacent sessions sequentially sorted by their respective click times is less than or equal to a first preset time threshold. Specifically, clickstream data points may be arranged sequentially according to the order of the respective click times. If the difference between the click times of two consecutive clickstream data points is less than or equal to the first preset time threshold, the two clickstream data points may be merged into one session.

A clickstream past three established submodule establishes, for each session, a clickstream path tree using the current webpage and the source webpage. The clickstream data point path free includes a node and path. The node is the current webpage, while the path indicates a connection between the current webpage and its source webpage.

A clickstream path tree merging submodule merges the clickstream path trees available, configures weights, and constructs a weighted-directed graph model for the user website click path.

A hierarchical weight assignment submodule module may be programmed to assign a hierarchical weight to each merged node by placing the node into one of the plurality of weight levels divided according to the average lengths of stay of the nodes, and assigning the hierarchical weight to the node according to the weight level to which the node is placed.

A weighted-directed graph generation submodule generates a weighted-directed graph.

A second selection submodule selects Y other users who share the most common paths with the current user, wherein Y is a positive integer.

A computation submodule computes the click path correlation between the current user and the selected Y other users.

Figure 8:
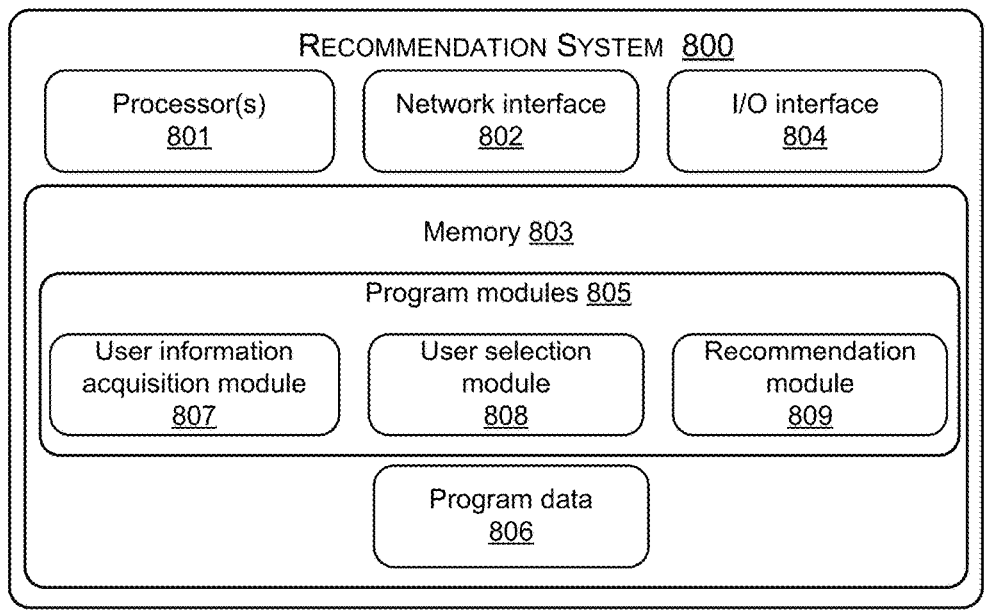
FIG. 8 is a block diagram of a system for making personalized recommendations based on user behavior.

In particular, FIG. 8 shows a block diagram of a system for making personalized recommendations based on user behavior. Recommendation system 800 may include, but is not limited to, one or more processors 801, a network interface 802, memory 803 and an input/output (I/O) interface 804. The memory 803 may include computer-readable media as described above. The memory 803 may include program modules 805 and program data 806. In an embodiment, the program modules 805 may include a user information acquisition module 807 programmed for acquiring user information which may include a user identifier; a user selection module 808 programmed for selecting Z other users who have the highest similarity to the current user, where Z is a positive integer; and a recommendation module 809 programmed for making personalized recommendations to the current user based on the information of the selected Z other users.

The user similarity is determined, by the programmed modules and submodules, using the methods described herein.

The above embodiments of the apparatus are closely related to the embodiments of the method described herein, and therefore the detailed description of the embodiments of the method is also applicable to the embodiments of the apparatus and is not repeated.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

Various embodiments of the present specification are described progressively increased details with examples and environments. Each embodiment may focus a certain aspect of the disclosure, and therefore different embodiments may differ from one another, but may also share similar parts.

Methods and apparatus of information verification have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method comprising:
    obtaining clickstream data of a current user, the clickstream data including a plurality of clickstream data points at a website;

dividing the plurality of clickstream data points into one or more sessions, difference between click times of any two adjacent sessions sequentially sorted by their respective click times being less than or equal to a preset time threshold;

computing a click path correlation between the current user and other users using the clickstream data, the computing the click path correlation including:

generating a clickstream path tree in each session using a current webpage and its source webpage, the clickstream path tree including a node and a path, the node being the current webpage, and the path indicating a connection between the current webpage and its source webpage;

generating a weighted-directed graph by merging one or more clickstream path trees;

assigning a hierarchical weight to each merged node; and assigning a proportional weight to each merged path;

selecting X other users whose click path correlations with the current user rank among the highest, X being a positive integer;

configuring a comprehensive weight in connection to each of preset tags of webpages visited by the selected X other users; and computing a user correlation between the current user and the X other users based on the preset tags and comprehensive weights.

2. The method described in claim 1, wherein:

each clickstream data point includes a user identifier, a current webpage, a source webpage, a click time and a length of stay; and the computing the click path correlation between the current user and the other users further includes:

selecting Y other users who share most common paths with the current user, wherein Y is a positive integer; and computing the click path correlation between the current user and the Y other users using the weighted-directed graph.

3. The method as recited in claim 1, wherein:

the hierarchical weight to each merged node is determined according to an average length of stay of the node;

the proportional weight to each merged path is determined according to a respective pageview number pv; and the average length of stay is calculated by dividing a total length of stay of the node by a total number of pageviews of the node, the totals being summed over the plurality of clickstream data points.

4. The method as recited in claim 1, wherein the assigning the hierarchical weight to each merged node comprises:

placing the node into one of the plurality of weight levels divided according to average lengths of stay of the nodes; and assigning the hierarchical weight to the node according to the weight level to which the node is placed.

5. The method as recited in claim 1, wherein:

each node is a root node or a child node; and the generating the clickstream path tree using the current webpage and the source webpage comprises:

matching the source webpage of a current clickstream data point with the current webpage of another clickstream data point having a click time prior to that of the current clickstream data point, according to a preset matching criterion; and if the matching is successful, making the current webpage of the current clickstream data point a child node of a next current webpage of the other matched clickstream data point; or if the matching is unsuccessful, generating a new clickstream path tree using the current webpage of the current clickstream data point as the root node thereof.

6. The method as recited in claim 5, wherein the preset matching criterion includes a preset maximum matches, or a preset maximum difference between the click times of the current clickstream data point and the matching clickstream data point.

7. The method as recited in claim 1, wherein the weighted-directed graph is defined by:

$$U=\{\ldots,<u_i,\lambda_i>,\ldots,<u_j,\lambda_j>,\ldots\},$$

wherein $<u_i, \lambda_i>$ represents webpage $u_i$ and its user clicking status, $u_i$ is the current webpage visited by the user, and $\lambda_i$ is the hierarchical weight of webpage $u_i$; and $$T=\{\ldots,<u_i,u_j,\delta_{ij}>,\ldots,<u_i,u_k,\delta_{ik}>,\ldots\}$$

wherein $<u_i, u_j, \delta_{ij}>$ represents a user click path direction from webpage $u_j$ to webpage $u_i$, $u_i$ is the current webpage, $u_j$ is the source webpage, and $\delta_{ij}$ is the proportional weight of the respective user click path direction.

8. The method as recited in claim 2, wherein the click path correlation between the current user and the Y other users is computed using the equation:

$$\text{correlation} = \frac{\Sigma\text{Minimum weights of common paths}}{\Sigma\text{Weights of noncommon paths} + \Sigma\text{Maximum weights of common paths}},$$

Wherein:

a minimum weight of a common path is a multiplication product of a minimum value of the proportional weight of the common path×a minimum value of the hierarchical weight of the current webpage indicated in the common path×the minimum value of the hierarchical weight of the source webpage indicated in the common path;

a maximum weight of the common path is a multiplication product of a maximum value of the proportional weight of the common path×a maximum value of the hierarchical weight of the current webpage indicated in the common path×the maximum value of the hierarchical weight of the source webpage indicated in the common path; and a weight of a non-common path is a multiplication product of a value of the proportional weight of the non-common path×the value of the hierarchical weight of the current webpage indicated in the non-common path×the value of the hierarchical weight of the source webpage indicated in the non-common path.

9. The method as recited in claim 1, wherein each webpage has a page weight, each preset tag on each webpage has an original weight, and the comprehensive weight of a preset tag is computed using an equation:

$$\vec{w} = \sum_{i=0}^{\sigma k} (w_i \times pv_i \times wp_i) / \sum_{i=0}^{\sigma k} pv_i$$

wherein $\vec{w}$ is the comprehensive weight of the preset tag, $\sigma k$ is a total number of webpages on which the preset tag appears, $w_i$ is the page weight of a webpage i, $pv_i$ is a total number of page views of the webpage i, and $wp_i$ is the preset tag's original weight on the webpage i.

10. The method as recited in claim 9, wherein the user correlation between the current user and the X other users is computed using an question:

$$Sim(i, j) = \frac{K(\vec{\Upsilon}_i, \vec{\Upsilon}_j)}{\sqrt{K(\vec{\Upsilon}_i, \vec{\Upsilon}_i)}\sqrt{K(\vec{\Upsilon}_j, \vec{\Upsilon}_j)}} = \frac{\sum_{n=1}^{k}(\vec{w}_{in} \times \vec{w}_{jn})}{\sqrt{\sum_{n=1}^{k} \vec{w}_{in}^2}\sqrt{\sum_{n=1}^{k} \vec{w}_{jn}^2}}$$

wherein Sim(i, j) is a user correlation between user i and user j, each user being represented by a respective vector $\vec{\Upsilon} = \{(\sigma_i, \vec{w}_1), (\sigma_2, \vec{w}_2), \ldots, (\sigma_k, \vec{w}_k)\}$, $\sigma$ represents the preset tag, and $\vec{w}$ represents the comprehensive weight of the preset tag.

11. A method comprising:
obtaining user information including a user identifier;
selecting Z other users who have a user similarity ranked among the highest to the user, where Z is a positive integer; and
making a recommendation to the user based on information of the selected Z other users,
wherein the user similarity is generated by a process comprising:
obtaining clickstream data of the user, the clickstream data including a plurality of clickstream data points;
dividing the plurality of clickstream data points into one or more sessions, a difference between click times of any two adjacent sessions sequentially sorted by their respective click times being less than or equal to a preset time threshold;
computing a click path correlation between the user and other users using the clickstream data, the computing the click path correlation including:
generating a clickstream path tree in each session using a current webpage and its source webpage, the clickstream path tree including a node and a path, the node being the current webpage, and the path indicating a connection between the current webpage and its source webpage;
generating a weighted-directed graph by merging one or more clickstream path trees;
assigning a hierarchical weight to each merged node; and
assigning a proportional weight to each merged path;
selecting X other users whose click path correlations with the current user rank among the highest, where X is a positive integer;
configuring a comprehensive weight in connection to each of preset tags of webpages visited by the selected X other users; and
computing a user correlation between the current user and the X other users based on the preset tags and comprehensive weights.

12. A computer-based apparatus comprising:
one or more processors; and
one or more memories stored thereon computer-executable instructions that when executed by the one or more processors, cause the one or more processors to perform acts comprising:
obtaining clickstream data of a current user, the clickstream data including a plurality of clickstream data points;
dividing the plurality of clickstream data points into one or more sessions, difference between click times of any two adjacent sessions sequentially sorted by their respective click times being less than or equal to a preset time threshold;
computing a click path correlation between the current user and other users using the clickstream data, the computing the click path correlation including:
generating a clickstream path tree in each session using a current webpage and its source webpage, the clickstream path tree including a node and a path, the node being the current webpage, and the path indicating a connection between the current webpage and its source webpage;
generating a weighted-directed graph by merging one or more clickstream path trees;
assigning a hierarchical weight to each merged node; and
assigning a proportional weight to each merged path;
selecting X other users whose click path correlation with the current user ranks among the highest, where X is a positive integer;
configuring a comprehensive weight in connection to each of preset tags of webpages visited by the selected X other users; and
computing a user correlation between the current user and the X other users based on the preset tags and comprehensive weights.

13. The computer-based apparatus described in claim 12, wherein:
each clickstream data point includes a user identifier, a current webpage, a source webpage, a click time and a length of stay; and
the computing the click path correlation between the current user and the other users further comprises:
selecting Y other users who share most common paths with the current user, wherein Y is a positive integer; and
computing the click path correlation between the current user and the Y other users, using the weighted-directed graph.

14. The computer-based apparatus as recited in claim 12, wherein:
the hierarchical weight to each merged node is determined according to an average length of stay of the node;
the proportional weight to each merged path is determined according to a respective pageview number pv; and
the average length of stay is calculated by dividing a total length of stay of the node by a total number of pageviews of the node, the totals being summed over the plurality of clickstream data points.

15. The computer-based apparatus as recited in claim 12, wherein the assigning the hierarchical weight to each merged node comprises:

placing the node into one of a plurality of weight levels divided according to the average lengths of stay of the nodes; and assigning the hierarchical weight to the node according to the weight level to which the node is placed.

16. The computer-based apparatus as recited in claim 12, wherein:

each node is a root node or a child node; and the generating the clickstream path tree using the current webpage and the source webpage comprises:

matching the source webpage of a current clickstream data point of the plurality of clickstream data points with the current webpage of another clickstream data point of the plurality of clickstream data points having a click time prior to that of the current clickstream data point, according to a preset matching criterion; and if the matching is successful, making the current webpage of the current clickstream data point a child node of the current webpage of the other matched clickstream data point; or if the matching is unsuccessful, generating a new clickstream path tree using the current webpage of the current clickstream data point as the root node thereof.

17. The computer-based apparatus as recited in claim 12, wherein the weighted-directed graph is defined by:

$$U=\{\ldots,<u_i,\lambda_i>,\ldots,<u_j,\lambda_j>,\ldots\},$$

wherein $<u_i, \lambda_i>$ represents webpage $u_i$ and its user clicking status, $u_i$ being the current webpage visited by the user, and $\lambda_i$ the hierarchical weight of webpage $u_i$; and $$T=\{\ldots,<u_i,u_j,\delta_{ij}>,\ldots,<u_i,u_k,\delta_{ik}>,\ldots\},$$

wherein $<u_i,u_j, \delta_{ij}>$ represents a user click path direction from webpage $u_j$ to webpage $u_i$, $u_i$ is the current webpage, $u_j$ is the source webpage, and $\delta_{ij}$ is the proportional weight of the respective user click path direction.

18. The computer-based apparatus as recited in claim 13, wherein the click path correlation between the current user and the Y other users is computed using an equation:

$$\text{correlation} = \frac{\Sigma \text{Minimum weights of common paths}}{\Sigma \text{Weights of noncommon paths} + \Sigma \text{Maximum weights of common paths}},$$

wherein:

a minimum weight of a common path is a multiplication product of a minimum value of the proportional weight of the common path×a minimum value of the hierarchical weight of the current webpage indicated in the common path×the minimum value of the hierarchical weight of the source webpage indicated in the common path;

a maximum weight of the common path is a multiplication product of a maximum value of the proportional weight of the common path×a maximum value of the hierarchical weight of the current webpage indicated in the common path×the maximum value of the hierarchical weight of the source webpage indicated in the common path; and a weight of a non-common path is a multiplication product of a value of the proportional weight of the non-common path×the value of the hierarchical weight of the current webpage indicated in the non-common path×the value of the hierarchical weight of the source webpage indicated in the non-common path.

19. The computer-based apparatus as recited in claim 12, wherein each webpage has a page weight, each preset tag on each webpage has an original weight, and the comprehensive weight of the preset tag is computed using an equation:

$$\vec{w} = \sum_{i=0}^{\sigma k} (w_i \times pv_i \times wp_i) \Big/ \sum_{i=0}^{\sigma k} pv_i$$

wherein $\vec{w}$ is the comprehensive weight of the preset tag, $\sigma k$ is a total number of webpages on which the preset tag appears, $w_i$ is the page weight of a webpage i, $pv_i$ is a number of page views of the webpage i, and $wp_i$ is the preset tag's original weight on the webpage i.

20. The computer-based apparatus as recited in claim 19, wherein the user correlation between the current user and the X other users is computed using an question:

$$Sim(i, j) = \frac{K(\vec{Y}_i, \vec{Y}_j)}{\sqrt{K(\vec{Y}_i, \vec{Y}_i)}\sqrt{K(\vec{Y}_j, \vec{Y}_j)}} = \frac{\sum_{n=1}^{k}(\vec{w}_{in} \times \vec{w}_{jn})}{\sqrt{\sum_{n=1}^{k}\vec{w}_{in}^2}\sqrt{\sum_{n=1}^{k}\vec{w}_{jn}^2}}$$

wherein Sim(i, j) is a user correlation between user i and user j, each user being represented by a respective vector $\vec{Y}=\{(\sigma_1,\vec{w}_1),(\sigma_2,\vec{w}_2),\ldots,(\sigma_k,\vec{w}_k)\}$, $\sigma$ represents the preset tag, and $\vec{w}$ represents the comprehensive weight of the preset tag.

* * * * *